(No Model.)
G. H. MARKER.
ANTIRATTLER.
No. 599,184. Patented Feb. 15, 1898.
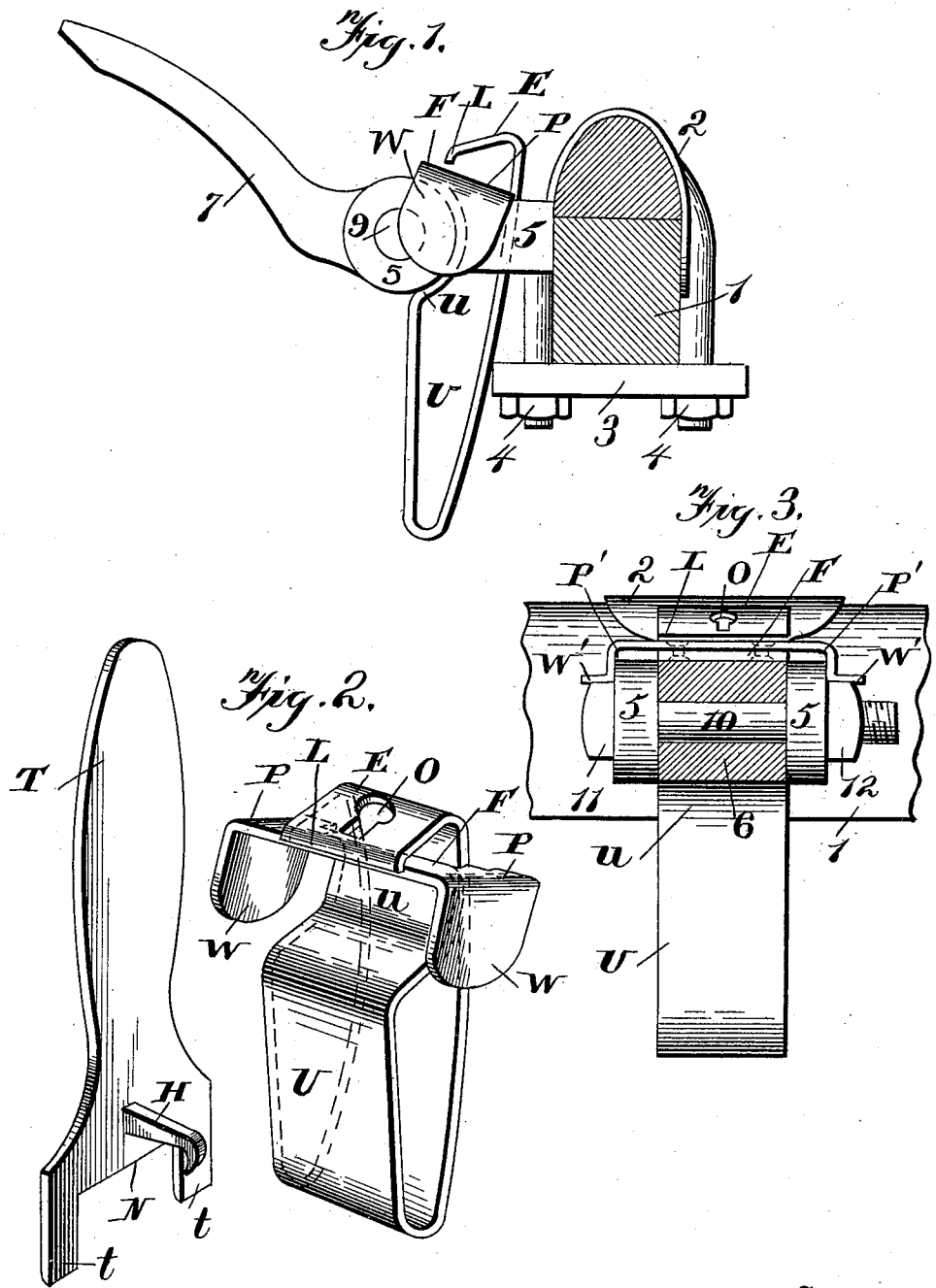
Witnesses:
Geo. E. Frech.
J. H. Jochum Jr.
Inventor:
George H. Marker,
by Collamer & Co., Attorneys.

UNITED STATES PATENT OFFICE.

GEORGE H. MARKER, OF SIOUX FALLS, SOUTH DAKOTA.

ANTIRATTLER.

SPECIFICATION forming part of Letters Patent No. 599,184, dated February 15, 1898.

Application filed December 27, 1897. Serial No. 663,600. (No model.)

*To all whom it may concern:*

Be it known that I, GEORGE H. MARKER, a citizen of the United States, and a resident of Sioux Falls, Minnehaha county, State of South Dakota, have invented certain new and useful Improvements in Antirattlers; and my preferred manner of carrying out the invention is set forth in the following full, clear, and exact description, terminating with claims particularly specifying the novelty.

This invention relates to thill-couplings, and more especially to the antirattlers used therein; and the object of the same is to produce a device of this character which is capable of being quickly inserted and removed and which when in place serves as an antirattler and as a lock for holding the pivot in place.

To this end the invention consists in the specific form of the antirattler-spring, as hereinafter described and claimed and as shown in the accompanying drawings, wherein—

Figure 1 is a section through the axle and a side elevation of one form of my spring in position. Fig. 2 is a perspective detail of this form of spring and of the tool for closing it, the latter being slightly removed from the spring and the spring illustrated with its lip engaged with the front arm. Fig. 3 is a cross-section through the thill-iron and a front elevation of the other parts in place, this view showing the use of the preferred form of my spring with outturned wings resting over the head and nut of the pivot-bolt.

The thill-coupling of itself may be of any approved or well-known pattern, as no invention is claimed therein; but in the present instance it is shown in the form of a clip 2, embracing the axle 1, with the usual clip-plate 3 and nuts 4, and the two forwardly-projecting perforated ears 5, between which stands the eye 6 at the rear end of the thill-iron 7, that is bolted or otherwise attached to the thill, a headless pin 9 or a bolt 10, with head 11 and nut 12, being passed through the perforations in the ears and that in the interposed eye to connect the parts pivotally together.

The letter U designates the spring proper of my improved antirattler, which spring is of substantially U shape in side elevation, preferably of leaf-steel, and having a rearward curve $u$ in its front arm to fit closely behind the eye 6 at the rear of the thill-iron, as usual. Just above this curve the front arm is bent forward, as at F, over the eye 6 and is projected laterally, as at P in Figs. 1 and 2, where the lateral parts of the arm are integral, or at P' in Fig. 3, where these projections are of another piece of metal riveted or otherwise secured to the arm. Indeed, it is not essential to either form of my spring that the projection should be integral or otherwise so long as it is rigidly connected with the spring. At the outer ends of this lateral projection are formed downturned wings W, which in Figs. 1 and 2 are of some considerable size and adapted to cover the ends of the perforations in the ears 5, so as to hold the headless pivot-pin 9 in place, but in Fig. 3 are bent outward, as at W', and are not necessarily so large, their function here being to stand above and in contact with one of the flat faces of the head 11 and nut 12 of the pivot-bolt 10 when used and to form a nut-lock therefor and prevent the unscrewing of the nut off the bolt or the bolt out of the nut, as will be clear. In either case, however, the wings engage the extremities of the pivot, and whatever their construction their function is to prevent the displacement of such pivot.

The rear arm of the spring U is provided at its upper end with a forward extension E, having a hole or opening O therein, and at its front end it is turned sharply downward into a short lip L. The latter is adapted, when drawn forward, to spring over and engage the upper end of the front arm of the spring or the upper corner of the lateral piece P, if secured thereon, so as to hold the two arms of the spring nearer each other than their normal position and take the spring-pressure off the rear face of the eye 6, and to permit this movement under the use of the tool described below such forward extension preferably inclines slightly downward from its rear toward its front end, as shown.

The letter T designates a tool, of stout flat metal, having at its operative end a notch N, providing two side teeth $t$, which may rest against the front faces of the ears 5, and, projecting laterally from its body above the notch, a hook H, about of the proportion and at the position indicated.

All parts of this device are of the desired sizes, shapes, and materials, and considerable change in the specific details of construction may be made without departing from the spirit of my invention.

In operation the two arms of the spring are pressed toward each other until the lip L of the rear arm springs over the upper extremity of the front arm, as seen in Fig. 2, after which the spring is placed within the clip with its curve $u$ to the front, the eye 6 is passed between the ears 5, and the pivot-pin 9 inserted through the registering perforations in the ears and eye, the wings W of the spring being at this time held automatically to the rear, so as not to interfere with the insertion of said pin; or if the pivot-bolt 10 is used the spring of Fig. 3 will be inserted within the clip in the same manner. The hook H of the tool T is then passed into the opening O of the forward extension E and rests upon the upper end of the front arm of the spring, and by a sharp movement of the tool this hook is caused to raise the lip L out of engagement with the front arm, when the parts spring into operative position. The curve $u$ then bears firmly against the rear of the eye 6 and prevents rattling of parts at all times, while the wings W pass over the ends of the pivot-pin 9, or their outturned ends W' rest upon the flat faces of the head 11 and nut 12 of the pivot-bolt 10, in either of which cases said pivot will be held from displacement, as will be understood. To remove the parts from this position, the tool is again employed. Its teeth $t$ are placed against the front faces of the ears 5 and its hook H engaged with the opening O, when by a forward pull on the handle the extension E is drawn to the front, and the lip L springs into engagement with the front arm, after which the parts may be separated in an obvious manner.

What I claim as new is—

1. The combination with a clip having side ears, a thill-iron whose eye stands between them, and a pivot through the ears and eye; of a U-shaped spring within the clip behind said eye, the rear arm of the spring having a forward extension with a downturned lip for engagement with the front arm to remove the spring-pressure when desired, substantially as described.

2. The combination with a clip having forwardly-projecting ears, a thill-iron whose eye stands between them, and a pivot-bolt through said ears and eye; of a U-shaped spring U behind the eye, its rear arm having a forward extension E provided with a downturned lip L at its front end for engagement with the front arm to remove the spring-pressure when desired, and said extension E also having a hole O for the purpose set forth, and the front arm of said spring having a rearward curve $u$ behind the eye and being bent forward at its upper end over the eye and then projected laterally over the ears, and wings at the ends of such lateral projections bent downward at the sides of the ears and then outward so as to rest upon the uppermost flat faces of the head and nut of said pivot-bolt, substantially as set forth.

In testimony whereof I have hereunto subscribed my signature on this the 24th day of December, A. D. 1897.

GEORGE H. MARKER.

Witnesses:
   EDSON H. HYDE,
   ALONZO H. STERRETT.